United States Patent [19]

Jones

[11] Patent Number: 4,488,522
[45] Date of Patent: Dec. 18, 1984

[54] PISTONS INCLUDING INSERTS

[75] Inventor: Kenneth J. Jones, Tamworth, England

[73] Assignee: AE PLC, Rugby, England

[21] Appl. No.: 410,918

[22] Filed: Aug. 24, 1982

[30] Foreign Application Priority Data

Aug. 28, 1981 [GB] United Kingdom ............... 8126272
Apr. 6, 1982 [GB] United Kingdom ............... 8210176

[51] Int. Cl.$^3$ ............................ F02F 3/00; F02F 5/00
[52] U.S. Cl. ...................... 123/193 CP; 123/193 P; 123/668; 92/213; 92/224; 29/156.5 R; 164/111
[58] Field of Search ............ 123/193 P, 193 CP, 668, 123/669; 164/111; 29/156.5 R; 92/213, 224

[56] References Cited

U.S. PATENT DOCUMENTS 2,124,360 7/1938 Welty ........................... 29/156.5 R
2,833,668 5/1958 Dailey et al. ................. 29/156.5 R
4,261,088 4/1981 Scott ............................. 164/111

FOREIGN PATENT DOCUMENTS 2410140 9/1975 Fed. Rep. of Germany ... 123/193 P
1230754 9/1960 France ............................ 123/41.35
2035448 6/1980 United Kingdom ............... 164/111

Primary Examiner—Craig R. Feinberg
Assistant Examiner—David A. Okonsky
Attorney, Agent, or Firm—Leydig, Voit, Osann, Mayer & Holt, Ltd.

[57] ABSTRACT

A piston includes an insert, such as a piston ring insert or crown insert. In order to prevent the insert springing off the piston body in an axial direction, the insert is so formed with a recess or recesses which interlock with projections on the piston body so that the mechanical interlock between them holds the insert securely on the piston body. Further interlocking recesses and projections may be provided which are arranged to prevent relative rotation between the insert and the piston body.

7 Claims, 18 Drawing Figures

PISTONS INCLUDING INSERTS

BACKGROUND OF THE INVENTION

1. Field of the Invention

The invention relates to pistons for internal combustion engines and including inserts, such as piston ring inserts and crown inserts, of a more resistant material than the material of the remainder of the piston.

Where a piston is made of a light metal such as aluminium or an aluminium alloy a piston ring cannot be accommodated in a piston ring groove formed directly on the light metal. This is because the piston rings are of an iron based material which would rapidly wear away the light metal. Accordingly, it is customary to include in the piston an annular piston ring insert which has a face flush with the skirt of the piston and which is made from an iron based material such as austenitic cast iron. A piston ring groove is formed in the insert and the insert, being of a harder material than the remainder of the piston, is better able to resist the wear from the piston ring.

In general, such inserts are located below the level of the crown so that, apart from the groove-carrying surface, they are surrounded by the material of the remainder of the piston. Thus, the piston ring insert is held securely in the piston body.

It has been proposed, however, to place the piston ring groove as close as possible to the crown. This, in turn, moves the piston ring as close as possible to the crown which has the advantage of reducing to a minimum the 'dead space' extending around the skirt above the piston ring and below the level of the crown. This, in consequence, reduces the volume of fuel/air mixture which collects in this space and whose incomplete combustion reduces the efficiency of the engine.

In order to achieve this, it is necessary to move the piston ring insert as far towards the crown as possible. This is done by having the insert in a rabbet extending around the crown so that the one surface of the insert forms a peripheral portion of the surface of the crown. Thus, since the insert is no longer surrounded by the remainder of the piston, the problem exists of preventing the piston ring insert from separating from the remainder of the piston in an axial direction i.e. from slipping off the end of the piston.

2. Description of the Prior Art

One previous proposal for overcoming this problem has been to make the insert radially narrower at the crown end than at the end remote from the crown so that the insert sits in a rabbet whose radial surface lies in a plane generally normal to the piston axis and whose overall surfaces subtends an angle of less than 90° with the radial surface. Thus there is a positive mechanical interlock between the insert and the remainder of the piston in an axial direction which prevents the insert slipping off. This has the diadvantage, however, that the narrowing path for heat conduction axially downwardly from the crown through the piston material, and the widening path for heat conduction axially downwardly from the crown through the insert, cause 'hot spots' to develop on the crown which can damage the narrow annular edge formed between the axially extending surface of the rabbet and the crown surface.

Satisfactory heat conduction can be achieved if the radial and axial surfaces are generally normal to one another. It has been thought that, even in the absence of positive mechanical interlock between the insert and the piston in such an arrangement, the insert will be held in position by a metallurgical bond thought to exist at the interface between the insert and the piston. Recent experience has shown, however, that this bond, if it exists, is insufficient to prevent the insert slipping off.

In addition, light metal pistons are, for certain applications such as diesel engines, provided with a combustion bowl in the crown. The edge between the upper end of the bowl and the crown surface of the piston at the entrance to the bowl is thin and is subject to the adverse conditions encountered in the combustion chamber. Under these conditions, an edge of aluminium or aluminium alloy tends to crack and this is plainly undesirable.

In order to overcome this problem, it has been proposed to include in the crown an insert of a material more resistant to the conditions in the combustion chamber than the aluminium or aluminium alloy of the piston. Such an insert is so located that the edge between the bowl and the crown surface is formed by the insert. Previous proposals for securing such inserts into the crown have included a screw-threaded connection and the use of a retaining ring welded to a part which is integral with the body.

Both of these proposals have disadvantages. Screw-threaded engagement is difficult since the piston and the insert generally have differing coefficients of expansion and an aluminium or aluminium alloy thread is relatively weak. Where a welded retaining ring is used, it is necessary to cast a ferrous insert into the aluminium or aluminium alloy body and then to weld the ring to the ferrous insert. The casting of the ferrous insert is complicated and there are also difficulties in ensuring that the crown insert is compressed by the welded ring.

SUMMARY OF THE INVENTION

According to a first aspect of the invention, there is provided a piston for an internal combustion engine and including a light metal body and an insert of a material more resistant than the material of the light metal body, the insert including a surface which engages a co-operating surface of the piston body, the insert surface and the piston surface being formed with at least one interlocking projection and recess and for preventing separation of said insert from the piston body in a direction parallel to the piston axis.

It is also a problem with pistons according to the first aspect of the invention that the insert can rotate relatively to the piston body. This can cause problems where the insert and piston body are being finish machined.

Preferably, therefore, the insert includes a surface which engages a co-operating surface of the piston body, the insert surface and the piston body surface being provided with at least one interlocking projection and recess so arranged as to prevent rotation of the insert relatively to the piston body about the piston axis.

According to a second aspect of the invention, there is provided an insert for a piston of an internal combustion engine, the insert comprising a member of an iron based material having at least one surface provided with at least one recess for forming a mechanical interlock with at least one corresponding projection on a piston body to prevent relative movement between the insert and the piston body in at least a direction parallel to the piston axis.

According to a third aspect of the invention, there is provided a method of manufacturing a piston for an internal combustion engine and comprising inserting into a piston mould an insert, and then filling the mould with a light molten metal so that the metal enters the at least one recess, solidifying the molten metal so that the metal in the at least one recess forms a projection interlocking therewith to prevent relative movement between the insert and the cast piston body in at least a direction parallel to the piston axis.

DESCRIPTION OF THE DRAWINGS

The following is a more detailed description of some embodiments of the invention, by way of example, reference being made to the accompanying drawings, in which.

DESCRIPTION OF THE PREFERRED EMBODIMENTS

Figure 1:
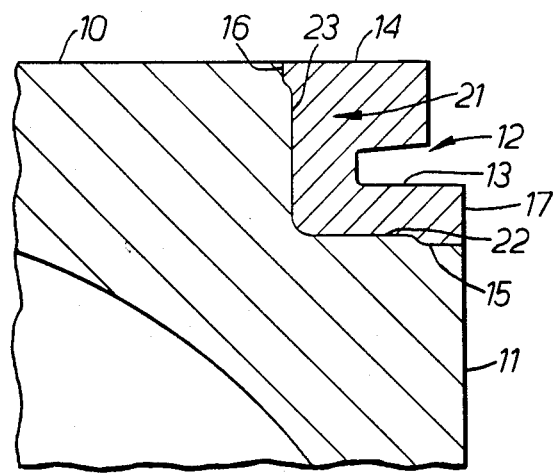
FIG. 1 is a vertical cross-section through a part of a first form of piston for an internal combustion engine.
Figure 2:
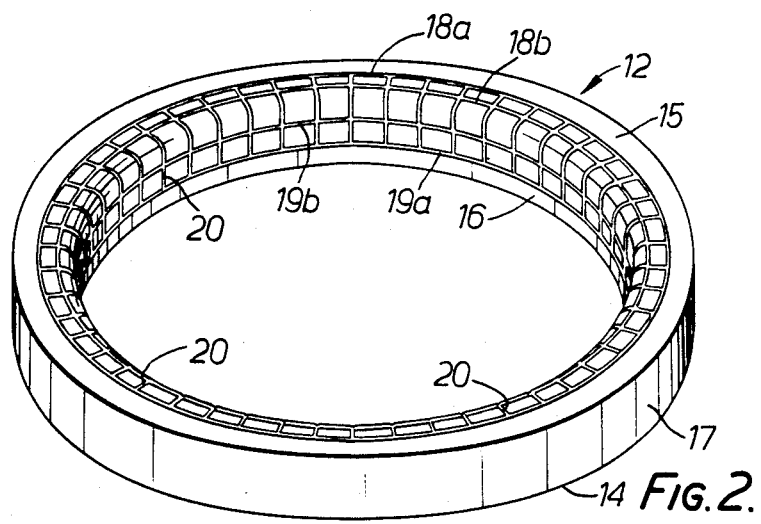
FIG. 2 is a perspective view from beneath of a piston ring insert for inclusion in the piston of FIG. 1.

Referring first to FIG. 1, the piston is cast from a light metal such as aluminium or aluminium alloy and is formed with a crown 10 and a skirt 11. The piston includes a piston ring insert 12 which is of an iron based material such as austenitic cast iron. The insert 12, in the finished state, includes a piston ring groove 13 for accommodating a piston ring (not shown) of L-shaped cross-section with the horizontal limb extending into the groove and the vertical limb extending upwardly to terminate substantially level with the crown.

Figure 3:
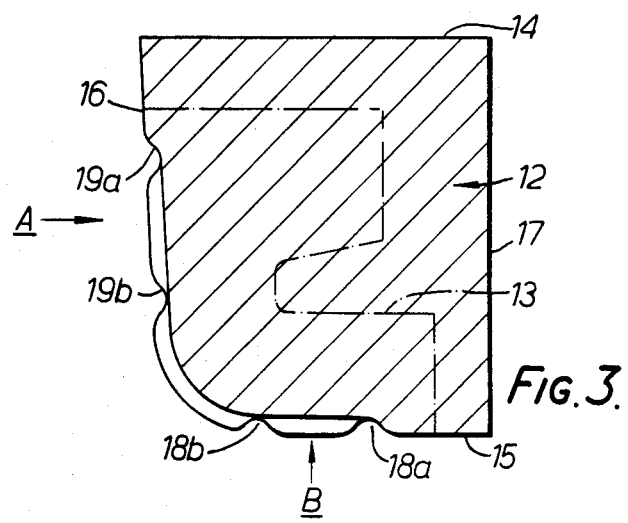
FIG. 3 is a cross-section through the insert of FIG. 2 on the line X—X of FIG. 4.
Figure 4:
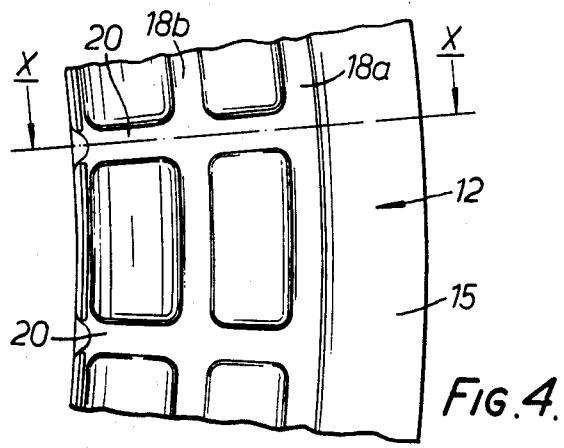
FIG. 4 is a view of the insert of FIGS. 2 and 3 on the arrow B of FIG. 3.
Figure 5:
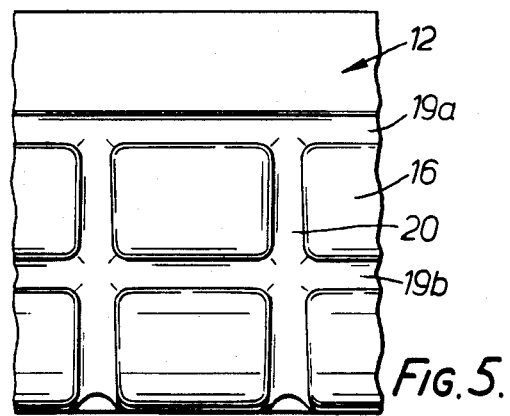
FIG. 5 is a view of the insert of FIGS. 2 to 4 on the arrow A of FIG. 3, FIGS. 6A, 6B, 6C and 6D show cross-sectional views of four alternative forms of the insert of FIGS. 1 to 5.

Referring now to FIGS. 2 to 5, the piston ring insert 12 is cast to have a generally rectangular cross-section (see FIG. 3) whose overall dimensions are larger than the required final dimensions of the insert (which are shown in chain dotted line in FIG. 3). The insert 12 has parallel, axially spaced upper and lower radially extending surfaces 14, 15 and parallel radially inner and outer axially extending surfaces 16, 17. As seen in FIGS. 3, 4 and 5, the lower radially extending surface 15 and the inner axially extending surface 16 are provided with a network of recesses formed by two parallel but spaced circumferential recesses 18a, 18b, 19a, 19b on each surface which intersect with a plurality of angularly spaced recesses 20 which extend radially along the lower surface 15 and axially along the inner surface 16 so that each recess 20 lies in a plane including the piston axis. The ends of these angularly spaced recesses 20 terminate at the axially upper and the radially outer circumferential recesses 18a, 19a so that they do not extend to the opposite edges of these surfaces.

The recesses 18a, 18b, 19a, 19b, 20 may be formed by casting or by machining or by casting followed by machining. Alternatively, some of the recesses may be cast and others machined. The recesses 18a, 18b, 19a, 19b, 20 are of generally semi-circular cross-section and may, for example be 0.5 mm in depth where the piston ring insert 12 is 120 mm in diameter.

The insert 12, in the form shown in FIGS. 2 to 5, is placed in a piston mould and molten light metal is poured into the mould. As the molten material is solidifying, pressure may be applied to the metal in a squeeze casting technique to reduce the voids in the cast piston. The molten metal, particularly, when under pressure, is forced into the recesses and the network-like interconnection between the recesses tends to ensure that molten metal enters all the recesses. When the metal has solidified, the cast piston body and the insert are removed from the mould. Because the recesses 20 terminate short of the outer surface of the piston, no molten metal reaches these surfaces via the recesses 20.

The mould and the insert 12 are arranged so that the piston body is cast with an L-shaped rabbet 21 extending around the crown. The rabbet 21 has a radially extending surface 22 co-operating with the lower insert surface 15 and an axially extending surface 23 co-operating with the inner insert surface 16 (see FIG. 1). Projecting beads of piston metal extend into the recesses 18a, 19a, 19b, 20 to provide a mechanical interlock between the piston body and the insert 12. The projections and recesses thus form an interlocking network.

After casting, the piston body and insert are finish machined by rotation of the as-cast piston about its axis and by the axial traverse along the piston of a tool. The insert 12 is machined to form the piston ring groove 13 and to machined the upper radially extending insert surface 14 flush with the crown 10 so that this surface 14 forms a peripheral portion of the crown surface.

Any tendency of the insert 12 to rotate relatively to the remainder of the piston during such machining is prevented by the interlock between the recesses 20 and the co-operating projections on the surface of the rabbet 21. In one example, this interlock has been found capable of resisting a turning torque of 20 tonnes.

When the piston is inserted into a cylinder of an internal combustion engine, any tendency of the insert 12 to spring off the piston in an axial direction is resisted by the engagement between the annular recesses 19a, 19b, and the co-operating projections on the rabbet 21. In one example, this engagement has been found to be capable of resisting a pull of 9 tonnes.

The generally rectangular cross-section of the insert 12 allows satisfactory heat transfer downwardly away from the crown 10 without the formation of 'hot spots'. In addition, the location of the uppermost piston ring closely adjacent the crown 10 reduces the fuel/air mixture around the skirt of the piston thus increasing the output of the engine. Increases of up to 8 horsepower have been achieved. The rotation-resisting recesses 20 may be omitted as may the circumferential recesses 18a, 18b on the lower radial insert surface 15. The recesses 19a, 19b on the inner axial insert surface 16 need not be continuous; they may be in angularly spaced sections. Only one such recess may be provided.

A single recess or set of recesses and interlocking projections may resist both rotation and axial movement of the insert 12. Such recesses may be provided on the inner axial insert surface 16 and extend parallel to one aother between the lower and upper edges of this surface.

FIGS. 6A, 6B, 6C and 6D show four alternative cross-sections of the insert 12, parts common to FIGS. 1 to 5 and to FIGS. 6A, 6B, 6C and 6D being given the same reference numerals and not being described in detail.

Figure 6A:
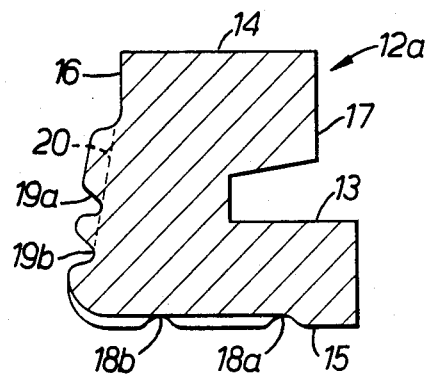

In FIG. 6A, the insert 12a has a generally trapezoidal cross-section with the lower surface 15 having a greater dimension in the radial direction, than the upper surface 14. The insert 15 has recesses 18a, 18b, 19a, 19b, 20 in the same arrangement as the corresponding parts in the embodiment of FIGS. 1 to 5. The trapezoidal cross-section of the insert ensures that, when it is cast into a piston, the shape of the insert ensures that it will not move axially relatively to the remainder of the piston.

Figure 6B:
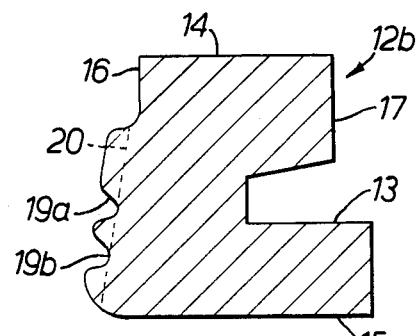

In FIG. 6B, the insert 12b has a similar trapezoidal cross-section to that of the insert 12a of FIG. 6A. The lower surface 15 is free from recesses but recesses 19a, 19b, 20 are provided on the inner surface 16, but in this case, only four of the rotation-resisting recesses 20 are provided equiangularly spaced around the insert 12b.

Figure 6C:
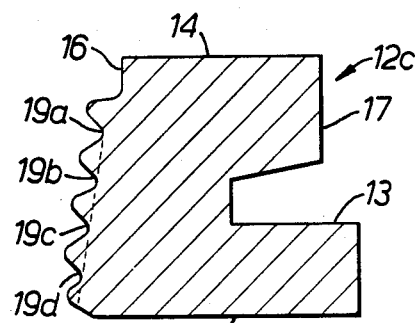

In FIG. 6C, the insert 12c has generally the same configuration as the insert 12b of FIG. 6B. In this insert 12c, however, the annular recess 19a, 19b, 19c, 19d, are formed by four spaced turns of a helical thread.

Figure 6D:
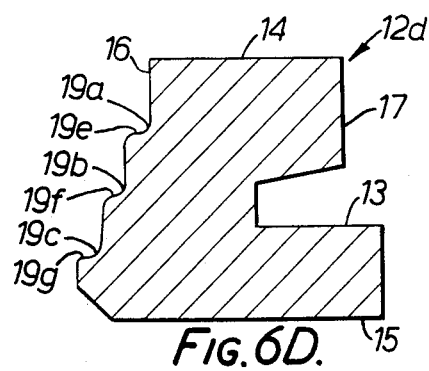

In FIG. 6D, the insert 12d has generally the same configuration as the inserts 12b and 12c of FIGS. 6B and 6C. The annular recesses 19a, 19b, 19c are, however, provided with steeper sides 19e, 19f, 19g, towards facing their upper ends so that these sides 19e, 19f, lie in respective planes generally normal to the axis of the insert 12d. These sides 19f, 19g provide a more positive interlock with the projection on the cast piston, so better resisting relative axial movement between the insert 12d and the remainder of the piston.

Figure 7:
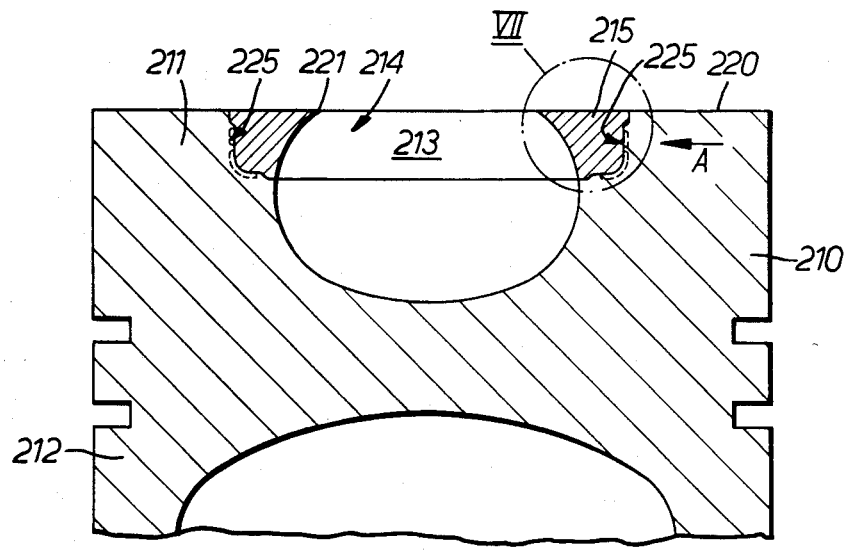
FIG. 7 is a cross-section of a crown end of a second form of piston for an internal combustion engine.
Figure 8:
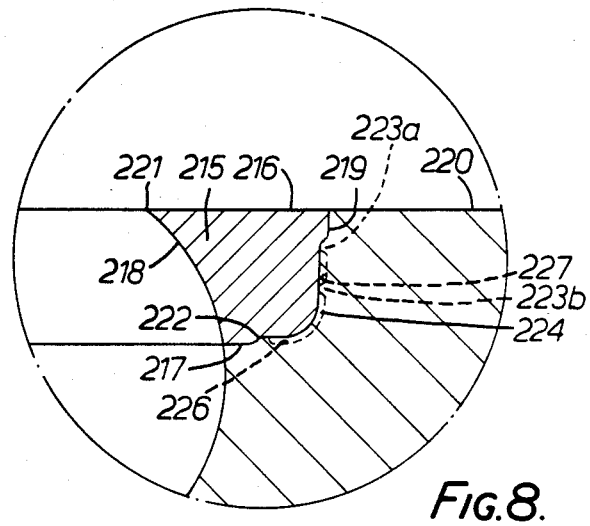
FIG. 8 is an enlarged view of a part of the piston of FIG. 7 as indicated.
Figure 9:
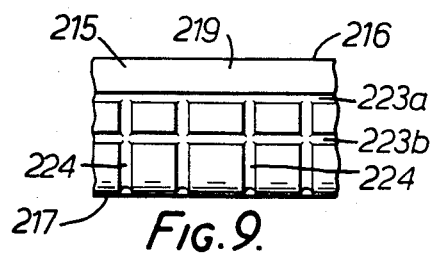
FIG. 9 is a view on the arrow A of FIG. 6.

Referring next to FIGS. 7 to 9, the piston 210 is cast from a light metal such as aluminium or aluminium alloy and is formed with a crown 211 and a skirt, part of which is shown at 212. The crown 211 is formed with a combustion bowl 213 whose diameter increases to a maximum from an entrance 214, before decreasing to the base of the bowl 213.

An insert 215 of an iron based material such as austenitic cast iron is provided around the entrance to the bowl 213. The insert 215 is generally annular in shape and is provided with axially upper and lower surfaces 216, 217 and radially inner and outer surfaces 218, 219. The upper surface 216 is flush with an end surface 220 of the crown 211 and the inner surface 218 defines a part of the surface of the combustion bowl 213. In addition, the upper surface 216 and the inner surface 218 define between them an edge 221 which extends around the entrance to the combustion bowl 213.

The insert 215 is cast from the iron based material to have a cross-section whose overall dimensions are larger than the required final dimensions of the insert. As seen in FIGS. 8 and 9, the lower surface 217 and the outer surface 219 are provided with a network of recesses formed by a circumferential recess 222, on the lower surface 217 and two parallel but spaced circumferential recesses 223a, 223b on the outer surface 219. These surfaces intersect with a plurality of angularly spaced recesses 224 which extend radially along the lower surface 217 and axially along the outer surface 219 so that each recess lies in a plane including the piston axis. The ends of these angularly spaced recesses 224 terminate at the axially upper and the radially inner circumferential recesses 223a, 222 so that they do not extend to the edges of these surfaces.

The recesses 222, 223a, 223b, 224 may be formed by casting or by machining or by casting followed by machining. Alternatively, some of the recesses may be cast and others machined. The recesses ar of generally semi-circular cross-section and may, for example, be 0.5 mm in depth.

The insert 215, in the form shown in FIGS. 8 and 9, is placed in a piston mould and a molten light metal is poured into the mould. As the molten metal is solidifying, pressure may be applied to the metal in a squeeze casting technique to reduce voids in the cast piston. The molten metal, particularly when under pressure, is forced into the recesses and the network like interconnection between the recesses tends to ensure that molten metal enters all the recesses. When the metal has solidified, the cast piston body and the insert are removed from the mould. Because the angularly spaced recesses 224 terminate short of the outer surface of the piston, no molten metal reaches these surfaces via the recesses 224.

The mould and the insert 214 are arranged so that the piston body is cast with a piston bowl 213 and an L-shaped rabbet 225 extending around the entrance to the combustion bowl 213. The rabbet 225 has a radially extending surface 226 co-operating with the lower insert surface 217 and an axially extending surface 227 co-operating with the inner insert surface 219 (see FIGS. 7 and 8). Projecting beads of piston metal extend into the recesses 222, 223a, 223b, 224 to provide a mechanical interlock between the piston body and the insert. The projections of recesses thus form an interlocking network.

After casting, the piston and insert are finished machined by rotation of the as-cast piston about is axis and by the axial traverse along the interior of the bowl 213 of a tool and by a radial traverse of the tool across the end face 220 of the crown 211. Any tendency of the insert 215 to rotate relatively to the remainder of the piston during such machining is prevented by the interlock between the recesses 224 and the co-operating projections on the surface of the rabbet 225.

When the piston is inserted into a cylinder of an internal combustion engine, any tendency of the insert 215 to spring off the piston in an axial direction is resisted by the engagement between the annular recesses 223a, 223b and the co-operating projections of the rabbet 225. Any tendency of the insert to move radially or axially is also resisted by a metallurgical bond at the interface of the piston and the insert. Since the edge 221 around the entrance of the combustion bowl 213 is formed of the material of the insert, it has a reduced tendency to crack in comparison with such edges made of the piston material. Further, the generally rectangular cross-section of the insert allows satisfactory heat transfer downwardly away from the crown without the formation of hot spots.

Figure 10:
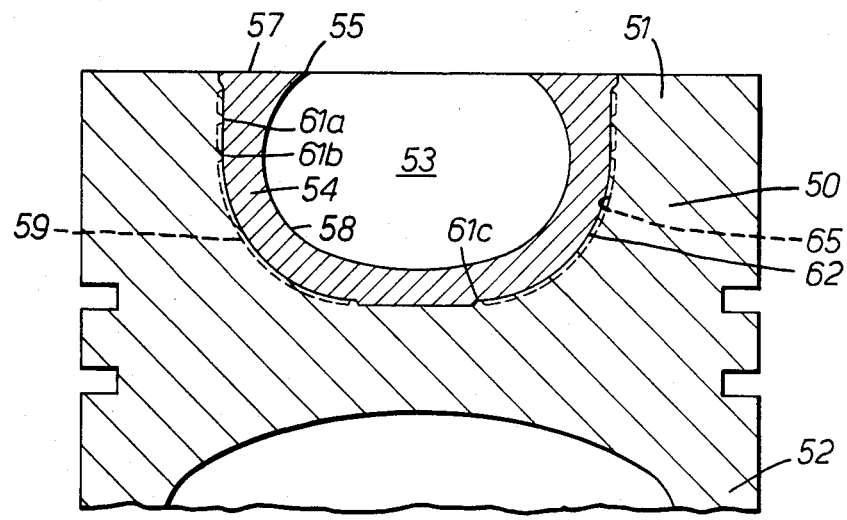
FIG. 10 is a cross-section of a crown end of a third form of piston for an internal combustion engine.
Figure 11:
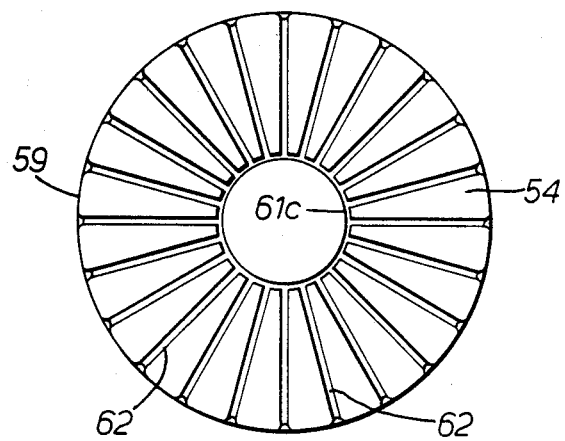
FIG. 11 is a view from beneath of an insert of the piston of FIG. 10.

Referring next to FIGS. 10 and 11, the third piston 50 comprises a crown 51 and a skirt, part of which is shown at 52. The crown 51 included a combustion bowl 53 whose diameter widens to a maximum from the entrance and then decreases to the base of the bowl 53.

The bowl 53 is defined by a cup-shaped insert 54 which is of an iron based material such as austenitic cast iron. The insert 54, in its finished state, defines an edge 55 extending around the entrance to the bowl 53.

The crown insert 54 is cast to have dimensions which are larger than the required final dimensions of the insert. The insert has a flat upper surface 57 and inner and outer surfaces 58, 59. The edge 55 is formed between the upper surface 57 and the inner surface 58. The upper surface 57, in the finished piston is flush with the surface of the crown 51. The outer surface 59 of the insert 54 is provided with a network of recesses formed by three parallel but spaced circumferential recesses 61a, 61b, 61c which intersect with a plurality of angularly spaced recesses 62 which extend between the lowermost and uppermost circumferential recesses 61a, 61c so that each recess 62 lies in a plane including the piston axis. The ends of these angularly spaced recesses 62 terminate at the uppermost and lowermost circumferential recesses 61a, 71c so that they do not extend to the upper surface 57 of the insert 54.

The recesses 61a, 61b, 61c, 62 may be formed by casting or by machining or by casting followed by machining. Alternatively, some of the recesses may be cast and others machined. The recesses are of generally semi-circular cross-section and may, for example, be 0.5 mm in depth.

The insert, in the form shown in FIGS. 10 and 11, is placed on a piston mould and molten light metal is poured into the mould. As the molten material is solidifying, pressure may be applied to the metal in a squeeze casting technique to reduce the voids in the cast piston. The molten metal, particularly when under pressure, is forced into the recesses and the network-like interconnection between the recesses tends to ensure that molten metal enters all the recesses. When the molten material has solidified, the cast piston and the insert are removed from the mould. Because the angularly spaced recesses 62 terminate short of the outer surface of the piston, no molten metal reaches this surface via the recesses 62.

The cast piston is thus formed with a depression 65 in which the insert 54 is received. The depression 65 has a shape corresponding to the shape of the outer surface 59 of the insert 53 and projecting beads of piston metal on this surface extend into the recesses 61a, 61b, 61c, 62 to provide a mechanical interlock between the piston body and the insert. The projections and recesses thus form an interlocking network.

After casting, the piston and insert are finish machined by a rotation of the as-cast piston about its axis and by the axial traverse along the interior of the insert 54 a tool and the radial traverse of the tool along the crown end of the piston so that the upper insert surface 57 is flush with the crown. Any tendency of the insert 54 to rotate relatively to the remainder of the piston during such machining is prevented by the interlock between the recesses 62 and the co-operating projections on the surface of the recess 65.

When the piston is inserted into a cylinder of an internal combustion engine, such as a diesel engine, any tendency of the insert to spring off the piston in an axial direction is resisted by the engagement between the annular recesses 61a, 61b, 61c and the cooperating projections on the depression 65. The generally constant cross-section of the insert 54 allows satisfactory heat transfer downwardly away from the crown without the formation of hot spots.

Referring next to FIGS. 12 to 15, the fourth piston 100 comprises a crown 101 and a skirt, part of which is shown at 102. The crown includes a combustion bowl 103 whose diameter widens from the entrance then decreases to the base of the bowl 103.

An insert 104 of an iron based material such as austenitic cast iron is provided covering the crown end of the piston 100 and forming a piston ring groove 105. The insert 104 is generally annular in shape and is provided with upper and lower radially extending surfaces 106, 107 and radially inner and outer surfaces 108, 109. The upper surface 106 defines the crown end of the piston and the inner surface 108 forms a part of the bowl 103 as well as defining, with the upper surface 106, an edge 110 which extends around the entrance to the combustion bowl 103. The outer surface 109 has the piston ring groove 105 formed therein.

An annular rib 111 depends from the lower surface 107 and is of generally rectangular cross-section with sides 112 and a lower surface 113. Each side 112 is formed with two parallel but spaced annular recesses 114 while a plurality of angularly spaced radial recesses 115 extend from the lower surface 107 to one side of the rib 111, down one side 112 across the lower surface 113, up the other side 112 to terminate on the lower surface surface 107 to the other side of the rib 111 (see FIGS. 9 and 10). The annular and radial recesses form a grid or network.

The recesses 114 and 115 may be formed by casting or machining or by casting followed by machining. Alternatively, some of the recesses may be cast and others machined. The recesses are of generally semicircular cross-section and may, for example, be 0.5 mm in depth.

Figure 12:
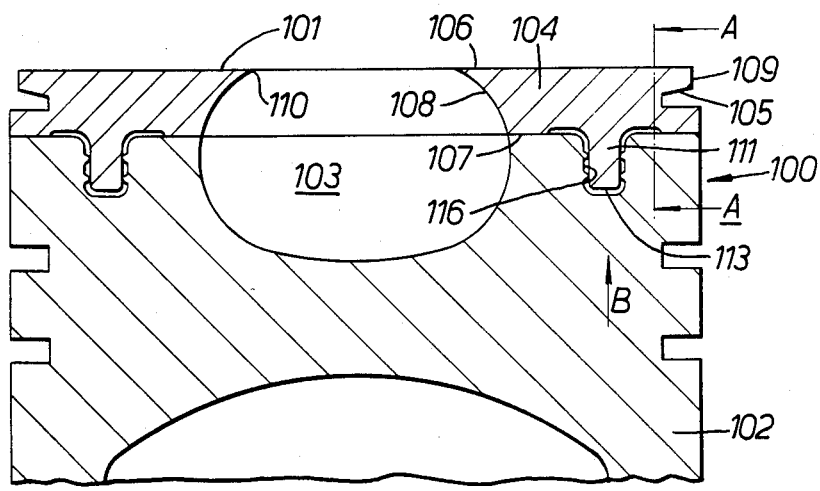
FIG. 12 is a cross-section of a crown end of a fourth form of piston for an internal combustion engine.
Figure 13:
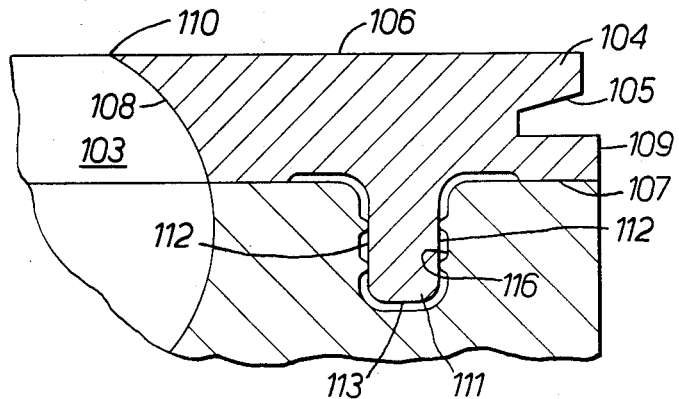
FIG. 13 is an enlarged view of part of the piston of FIG. 12.
Figure 14:
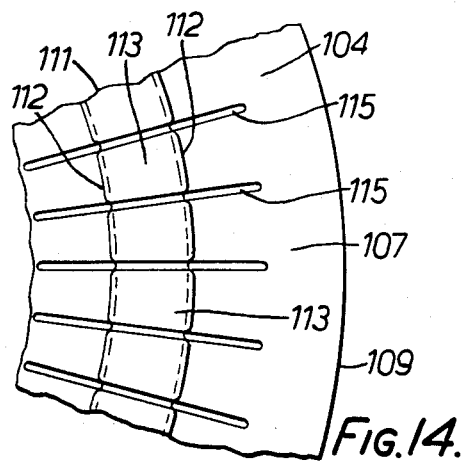
FIG. 14 is a view on the arrow B of FIG. 12 of an insert of the piston of FIGS. 12 and 13.
Figure 15:
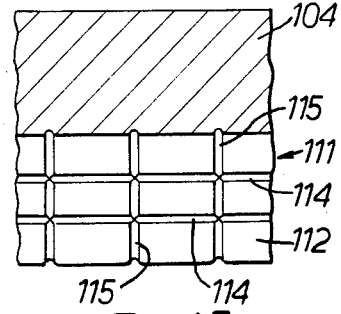
FIG. 15 is a cross-section of the insert of FIG. 14 on the lines A—A of FIG. 12.

The insert, in the form shown in FIGS. 12 and 15, is placed on a piston mould and molten light metal is poured into the mould. As the molten material is solidifying, pressur may be applied to the metal in a squeeze casting technique to reduce the voids in the cast piston. The molten metal, particularly when under pressure, is forced into the recesses and the network-like interconnection between the recesses tends to ensure that molten metal enters all the recesses. When the molten material has solidified, the cast piston and the insert are removed from the mould. Because the angularly spaced recesses 115 terminate short of the outer surface of the piston, no molten metal reaches this surface via the recesses 115.

The cast piston is thus formed with a groove 116 in which the rib 111 is received. The groove 116 has a generally rectangular shape corresponding to the shape of the rib 111 and projecting beads of piston metal on this surface extend into the recesses 114, 115 to provide a mechanical interlock between the piston body and the insert. The projections and recesses thus form an interlocking network.

After casting, the piston and insert are finish machined by a rotation of the as-cast piston about its axis and by the axial traverse along the interior of the piston and insert 104 of a tool and the radial traverse of the tool along the upper insert surface 106. The ring groove 105 is also finish machined. Any tendency of the insert 104 to rotate relatively to the remainder of the piston during such machining is prevented by the interlock between the recesses 114, 115 and the co-operating projections on the surface of the groove 116.

When the piston is inserted into a cylinder of an internal combustion engine, such as a diesel engine, any tendency of the insert to spring off the piston in an axial direction is resisted by the engagement between the annular recesses 114 and the co-operating projections on the groove 116. The generally constant cross-section of the insert 104 allows satisfactory heat transfer downwardly away from the crown with the formation of hot spots.

The following alternative features relate to all four embodiments of the piston described above with reference to the drawings.

It will be appreciated that the inserts 12, 214, 54, 104 could be formed with the projections, for engagement with recesses formed during casting of the piston. In addition, the rotation resisting recesses, 20, 221, 62, 115 may be omitted.

In the embodiments of FIGS. 1 to 6A and 7 to 9, the circumferential groove or grooves 18a, 18b, 222 on the lower surface 15, 217 of the insert 12, 215, may be omitted.

In any embodiment, the recesses need not be continuous, they could be in spaced sections. In addition, a single recess or set of recesses and interlocking projections may resist both rotation and axial movement of the insert 12, 215, 54, 104.

Where the insert is made of a material other than austenitic cast iron, the material selected should have a coefficient of expansion, at the operating temperatures of the piston, which is comparable with that of the material of the piston itself.

In all the above described embodiments, there is a metallurgical bond created between the co-operating piston and insert surfaces, as well as the interlock between the recesses and the projections. In cases where it is required to minimise heat transfer from the insert to the piston body, the metallurgical bond may be omitted with the insert being secured to the piston body only by the interlocking recesses and projections.

I claim:

1. A piston for an internal combustion engine comprising:
    a crown formed at one end of the piston,
    a cast body of a light metal material,
    an insert of a material more resistant than the material of the light metal body, and incorporated into the piston during casting of the light metal body,
    a piston feature formed in the insert,
    a crown surface included on the insert and forming at least a portion of said crown of the piston,
    at least one further surface to said insert, said at least one further surface extending generally parallel to an axis of the piston which is normal to said crown,
    at least one piston body surface co-operating with said at least one further surface of the insert,
    a plurality of shallow recesses extending circumferentially around said at least one further surface of the insert,
    a plurality of projections formed on said at least one piston body surface by the material of the piston body and extending into the shallow recesses to interlock therewith, said at least one further surface of said insert also includes a plurality of rotation-preventing shallow recesses extending in a direction generally parallel to said piston axis and a plurality of spaced projections being provided on said at least one piston body surface and extending into the rotation-preventing shallow recesses to interlock therewith, so preventing movement of the insert relative to the piston body.

2. A piston according to claim 1 wherein the plurality of rotation-preventing recesses and the plurality of circumferential recesses intersect to form a mesh or grid.

3. A piston according to claim 1 wherein the insert is an annular insert having radially spaced inner and outer surfaces and axially spaced upper and lower surfaces, the outer surface including a piston ring groove which forms said piston feature, the inner and lower surfaces forming said at least one further surface to said insert and engaging co-operating surfaces of a rabbet of L-shaped cross-section which extend around a crown of the piston body and which form said at least one piston body surface, the co-operating surfaces being provided with a mesh or grid of interlocking shallow recesses and projections for preventing axial separation and relative rotation of the insert and the piston body.

4. A piston according to claim 1, wherein the piston includes a combustion bowl, wherein the insert is a crown insert arranged in the crown of the piston, the insert including two adjacent surfaces which form a peripheral edge of an entrance to the combustion bowl.

5. A piston according to claim 4 wherein the insert is of generally annular shape, wherein said at least one piston body surface forms a rabbet of L-shaped cross-section and extending around the entrance to the combustion bowl, the rabbet receiving the insert, and said at least one further surface of the insert and the rabbet being formed with interlocking shallow recesses and projections for preventing axial separation and relative rotation of the insert and the piston body.

6. A piston according to claim 4 wherein the insert is generally cup-shaped and is set in the piston with an inner surface of the insert defining the combustion bowl and the shallow recesses and projections being formed on the outer surface of the insert and on the co-operating piston body surface.

7. A piston according to claim 4 wherein the insert is of generally annular shape and is provided with a depending annular rib received in a corresponding annular groove in the piston body, the projections and recesses being formed on the rib surfaces and the groove surfaces.

* * * * *